(12) United States Patent
Martini et al.

(10) Patent No.: US 10,460,109 B2
(45) Date of Patent: *Oct. 29, 2019

(54) MALICIOUS PROGRAM IDENTIFICATION BASED ON PROGRAM BEHAVIOR

(71) Applicant: iBoss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,219

(22) Filed: Oct. 6, 2017

(65) Prior Publication Data

US 2018/0032732 A1 Feb. 1, 2018

Related U.S. Application Data

(63) Continuation of application No. 14/697,558, filed on Apr. 27, 2015, now Pat. No. 9,785,776.

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01)

(58) Field of Classification Search
CPC ............................... G06F 21/566; G06F 21/53
USPC ......................................................... 713/167
See application file for complete search history.

(56) References Cited

U.S. PATENT DOCUMENTS

| 8,938,808 | B1 | 1/2015 | Spertus et al. |
| 9,104,867 | B1 * | 8/2015 | Thioux .................. G06F 21/56 |
| 9,378,385 | B1 | 6/2016 | Zhu |
| 2011/0197277 | A1 | 8/2011 | Figlin et al. |
| 2015/0101047 | A1 | 4/2015 | Sridhara |

OTHER PUBLICATIONS

Geier, "How to Keep your PC Safe with Sandboxing", Jan. 16, 2012, downloaded from the internet at: http://www.techhive.com/article/247416/how_to_keep_your_pc_safe_with_sandboxing.html on Nov. 25, 2014, 3 pages.
Palo Alto Networks, "Wildfire: Automatically Detect and Prevent Unknown Threats", 2014, downloaded from the internet at: https://www.paloaltonetworks.com/products/technologies/wildfire.html on Nov. 25, 2014, 1 page.
Palo Alto Networks, "Wildfire Datasheet", 2014, downloaded from the internet at: https://www.paloaltonetworks.com/content/dam/paloaltonetworks-com/en_US/assets/pdf/datasheets/wildfire/wildfire.pdf on Nov. 25, 2014, 4 pages.
Singh, et al. "Hot Knives Through Butter: Evading File-based Sandboxes", 2014, downloaded from the internet at: https://www.fireeye.com/content/dam/legacy/resources/pdfs/fireeye-hot-knives-through-butter.pdf on Nov. 25, 2014, 27 pages.

* cited by examiner

*Primary Examiner* — Jason K Gee
*Assistant Examiner* — Angela R Holmes
(74) *Attorney, Agent, or Firm* — Fish & Richardson P.C.

(57) ABSTRACT

An execution of a data object is identified by a computing device. In response to identifying the execution of the data object, it is determined that the data object has requested a sensitive action of the computing device before interacting with a user of the computing device. In response to determining that the data object has requested the sensitive action, the data object is classified as a high-risk data object.

24 Claims, 8 Drawing Sheets

MALICIOUS PROGRAM IDENTIFICATION BASED ON PROGRAM BEHAVIOR

CROSS-REFERENCE TO RELATED APPLICATIONS

This application is a continuation application of and claims priority to U.S. application Ser. No. 14/697,558, filed on Apr. 27, 2015.

BACKGROUND

Malicious software includes software programs that can or does perform actions that can harm or work against the interest of a user or computer system owner. Examples of such software include "adware" programs that monitor user behavior and present ads to the user, "spyware" programs that monitor user behavior, and computer viruses that may perform various malicious actions, including deleting files, and taking control of the user's computer to perform unauthorized operations.

SUMMARY

In one aspect, a method is performed by data processing apparatus. The method includes identifying an execution of a data object by a computing device. The method further includes, in response to identifying the execution of the data object, determining that the data object has requested a sensitive action of the computing device before interacting with a user of the computing device. The method further includes in response to determining that the data object has requested the sensitive action, classifying the data object as a high-risk data object.

Implementations can include any, all, or none of the following features. The sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device. The data object interacting with the user of the computing device includes at least one of: generating a dialog box, displaying a progress bar, displaying a window with an input element, or receiving input from the user. The method including in response to classifying the data object as a high-risk data object, performing a corrective action on the data object. The corrective action includes at least one of terminating the execution of the data object, increasing a risk metric associated with the data object, setting a risk metric associated with the data object, quarantining the data object, logging additional requests by the data object, or deleting the data object. The method including executing the data object in a sandboxed environment wherein requests for sensitive actions are examined by the sandboxed environment before they are provided to the computing device. The method including replacing instructions in the data object that request sensitive actions with corresponding instructions that pass requests for sensitive actions to an execution manager, the execution manager configured to examine the requests for sensitive actions before they are provided to the computing device. The data object includes at least one of an executable program, a file including executable instructions and file data, or a script including executable instructions. The execution of the data object includes at least one of executing instructions in the data object, or interpreting instructions in the data object for execution.

In one aspect, a computer storage media is tangibly encoded with computer program instructions that, when executed by one or more processors, cause a computer device to perform operations. The operations include identifying an execution of a data object by a computing device. The operations further include in response to identifying the execution of the data object, determining that the data object has requested a sensitive action of the computing device before interacting with a user of the computing device. The operations further include in response to determining that the data object has requested the sensitive action, classifying the data object as a high-risk data object.

Implementations can include any, all, or none of the following features. The sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device. The data object interacting with the user of the computing device includes at least one of: generating a dialog box, displaying a progress bar, displaying a window with an input element, or receiving input from the user. The computer storage media including in response to classifying the data object as a high-risk data object, performing a corrective action on the data object. The corrective action includes at least one of terminating the execution of the data object, increasing a risk metric associated with the data object, setting a risk metric associated with the data object, quarantining the data object, logging additional requests by the data object, or deleting the data object. The computer storage media including executing the data object in a sandboxed environment wherein requests for sensitive actions are examined by the sandboxed environment before they are provided to the computing device. The computer storage media including replacing instructions in the data object that request sensitive actions with corresponding instructions that pass requests for sensitive actions to an execution manager, the execution manager configured to examine the requests for sensitive actions before they are provided to the computing device. The data object includes at least one of an executable program, a file including executable instructions and file data, or a script including executable instructions. The execution of the data object includes at least one of executing instructions in the data object, or interpreting instructions in the data object for execution.

In one aspect, a system includes one or more processors configured to execute computer program instructions. The system further includes computer storage media tangibly encoded with computer program instructions that, when executed by one or more processors, cause a computer device to perform operations. The operations include identifying an execution of a data object by a computing device. The operations further include in response to identifying the execution of the data object, determining that the data object has requested a sensitive action of the computing device before interacting with a user of the computing device. The operations further include in response to determining that the data object has requested the sensitive action, classifying the data object as a high-risk data object.

Implementations can include any, all, or none of the following features. The sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device. The data object interacting with the user of the computing device includes at least one of: generating a dialog box, displaying a progress bar, displaying a window with an input element, or receiving input from the user. The system including in response to classifying the data object as a high-risk data object, performing a corrective action on the data object. The corrective action includes at least one of terminating the execution of the data object, increasing a risk metric associated with the data object, setting a risk metric associated with the data object, quarantining the data object, logging additional requests by the data object, or deleting the data object. The system including executing the data object in a sandboxed environment wherein requests for sensitive actions are examined by the sandboxed environment before they are provided to the computing device. The system including replacing instructions in the data object that request sensitive actions with corresponding instructions that pass requests for sensitive actions to an execution manager, the execution manager configured to examine the requests for sensitive actions before they are provided to the computing device. The data object includes at least one of an executable program, a file including executable instructions and file data, or a script including executable instructions. The execution of the data object includes at least one of executing instructions in the data object, or interpreting instructions in the data object for execution.

Implementations can include any, all, or none of the following features.

DESCRIPTION OF DRAWINGS

Like reference symbols in the various drawings indicate like elements

DETAILED DESCRIPTION

Data objects (e.g., software programs, data files) installed on a computer system may include malicious instructions, such as viruses, macros, scripts, or other instructions embedded in the object that perform malicious operations without the user's knowledge. Security programs such as anti-virus software generally scan a computer for known malicious data objects (such as by filename or based on a file signature of a virus or other malicious program), or monitor activity on the computer to detect such objects. Some malicious programs may include functionality to evade such security programs, such as by changing their own instructions or data footprint so as not to be recognized by a scan (a technique known as polymorphism), or by attacking the security software itself. Such security software may therefore be ineffective in some cases.

Accordingly, the present application describes techniques for identifying data objects as possibly malicious by detecting objects that perform sensitive program operations before interacting with the user. One example method includes, identifying an execution of a data object by a computing device, such as, for example, installing, opening, or running the data object. In response to identifying the execution of the data object, the data object is determined to have requested a sensitive action of the computing device before interacting with a user of the computing device. For example, the data object, upon being opened, may attempt to make a change to registry of the computing device without displaying a dialog box or other visual interaction to the user. In response to determining that the data object has requested the sensitive action, the data object may be classified as a high-risk data object (e.g., a data object that has performed potential malicious operations).

In some implementations, the present techniques may be used by a virtual environment to execute data objects requested by a particular computing device. Such a virtual environment may selectively provide data objects to the particular computing device based on whether malicious behavior is detected.

The techniques described herein may provide the following advantages. By identifying data objects as high-risk early in their execution, such as when they are installed or when they begin running, the present techniques may reduce the chance that such data objects will execute long enough to cause damage to a computing device or to cause the device to perform unintended behaviors. Further, the present techniques may be less affected by standard evasion techniques, such as polymorphism, used by viruses and other malicious programs, as the present techniques do not rely on detecting a program signature or other attribute of the malicious program.

Figure 1A:
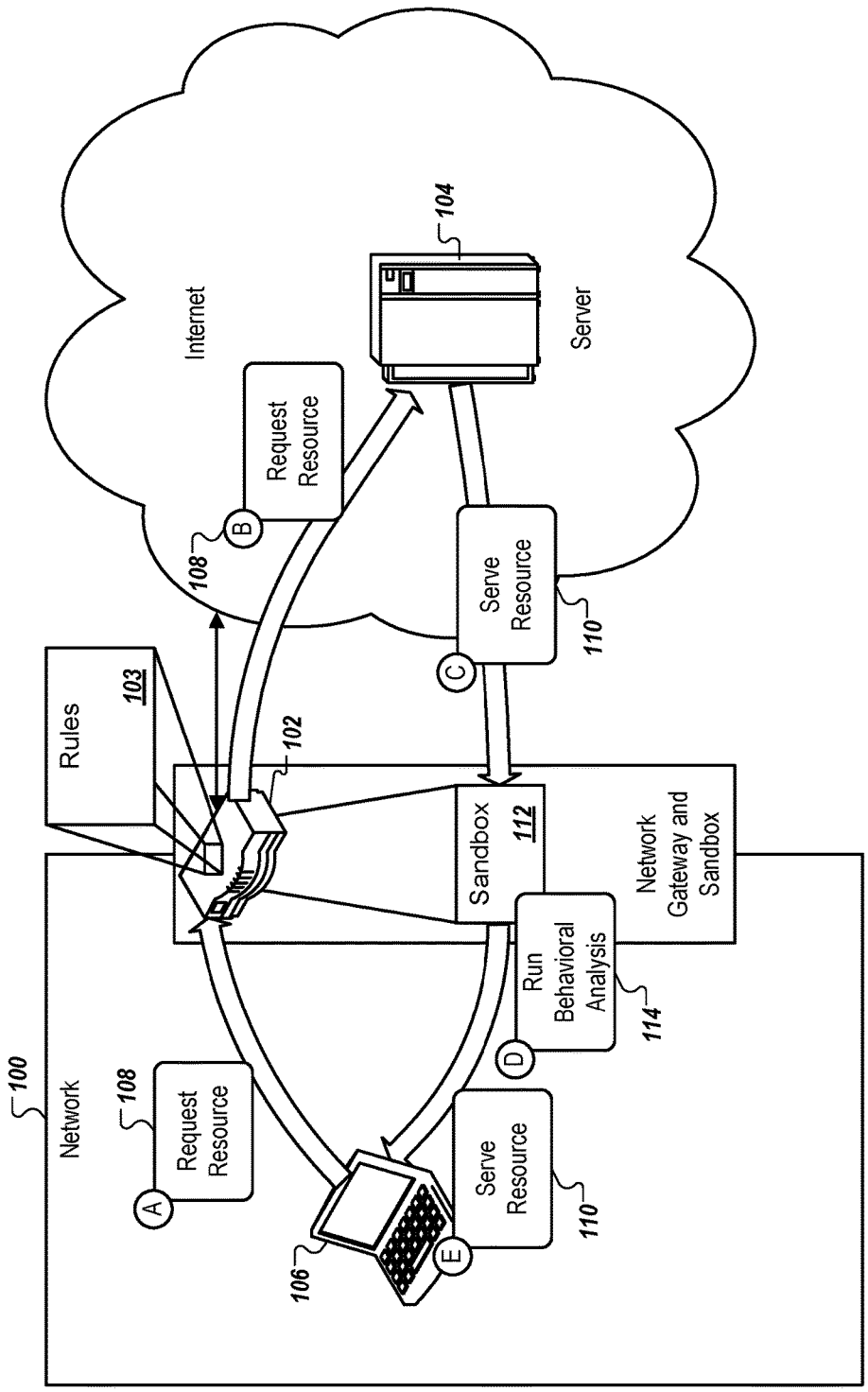
FIGS. 1A, 1B, and 1C are block diagrams of example computer systems in which the present techniques for identifying malicious data objects may be implemented.
Figure 1B:
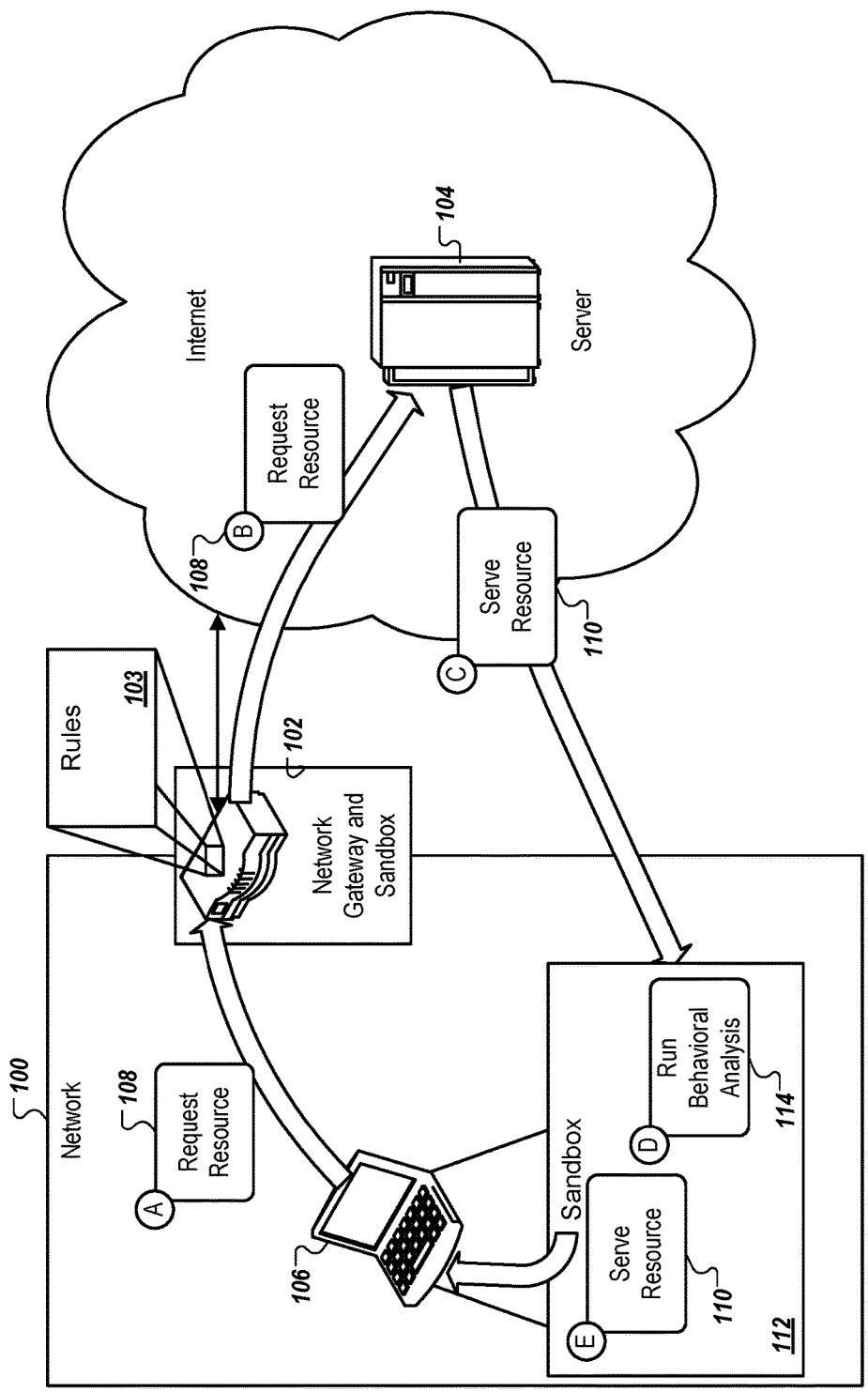

FIGS. 1A and 1B are block diagrams of example environments in which the present techniques for identifying malicious data objects may be implemented. The computer network 100 includes a network gateway 102 that includes a sandbox environment for running unknown software. Also shown in the network 100 is a browser device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106 and/or network gateways 102.

The network 100 can be configured to route some or all of the messages addressed outside the network 100 to the network gateway 102. The network gateway 102 can inspect the messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly.

Additionally, the network 100 can be configured to route some or all of the messages addressed into the network 100 through the network gateway 102. The network gateway 102 can inspect the messages and, optionally, modify or drop some messages. For example, the network gateway 102 may be configured to prevent traffic from a particular class of application (e.g., chat, files sharing). The network gateway 102 may also be configured to intercept messages intended for a recipient inside of the network 100 and reply directly.

The network gateway 102 may intercept some traffic addressed to recipients inside the network 100, for example to enforce security or other network policies. For example, one or more messages that contain data objects (e.g., executable binary instructions, interpretable scripts, or the like) that are addressed to a recipient in the network 100 can be received by the network gateway 102. Instead of routing the one or more messages, the network gateway 102 may instead test the data object to determine if it is likely to be malicious. If it is determined not likely to be malicious, the network gateway 102 may then route the message or messages on their way to the addressed recipient. If the data object is determined to be high-risk, the network gateway 102 may take an appropriate action such as deleting the software, serving a webpage to the intended recipient indicating that the data object was found to be high-risk, or holding the software in quarantine of further testing or analysis. An example process for determining high-risk data objects is described below relative to FIG. 2.

In one example, the client device 106 generate a request message 108 addressed to a resource hosted on a server 104. This request may be, for example, a hypertext transfer protocol (HTTP) GET message that includes the universal resource locator (URL) of the server 104 or a resource hosted on the server 104. The network gateway 102 may, possibly after examining the request 108 for any applicable security or network policies, route the request 108 to the server 104.

The server 104 can receive the request 108 and determine that the server 104 should reply by serving the requested resource. To do so, the server 104 can create a response 114 that includes the requested resource. The server 104 can send this response 114 to the client device 106. To reach the client device 106, the response 110 can be routed through the network gateway 102. Instead of routing the response 110 to the client device 106, the network gateway 102 can intercept the response 110 to determine if the response 110 complies with security or other network policies of the network 100.

For example, the network gateway 102 may include rules 103 that define a security policies of the network. One such policy may specify that particular data objects should be tested in a sandbox. In general, a sandbox is a controlled execution environment where, for example, an unknown data object can be run without allowing the data object to access critical components of a computing device.

Instead of routing the reply 110 to the client device 106, the network gateway 102 can initiate a sandbox 112 and run the data object attached to the reply 110. The sandbox 112 can allow the data object to run, install, or open it using an associated application, such as using a word processing program to open a text document. The sandbox 112 can apply one or more tests to the data object to determine if the data object contains malicious functionality or is likely to contain malicious functionality. For example, the sandbox 112 may execute the data object for a period of time, and determine whether it performs sensitive operations before generating a user-facing event, such as a dialog box. Sensitive operations may include, but are not limited to, accessing system files, accessing the registry, accessing the network, encrypting files, executing certain system calls (e.g., "ioctl," or "sudo"), or other operations. For example, a program that encrypts user's files without generating an interface to receive instructions from the user may be identified as likely malicious and handled as high-risk.

If the data object is determined to be high-risk, the network gateway 102 may take an appropriate action. These actions may be specified by the rules 103. For example, the network gateway 102 may drop any communications with the server 104, may quarantine the received data object, and/or may subject the data object to additional testing. This additional testing may, for example, take longer than the initial tests used to determine the data object is high-risk. In some cases, the additional testing may be more accurate, but at the cost of processing time.

In these cases, a webpage or other message may be served to the client device 106 informing the client device 106 that the reply 110 has been blocked. If the data object is found to be low-risk or found not to contain malicious behavior, the reply 110 may be sent to the client device.

Referring to FIG. 1B, the network 130 differs from the network 100 of FIG. 1A at least in that the client device 106 hosts the sandbox 112 instead of the network gateway 102 hosting the sandbox 112. In other examples, both the network gateway 102 and the client device 106 may host their own sandboxes 112.

Hosting the sandbox at the client devices 106 instead of the network gateway 102 may have a number of implications for the computers systems. For example, by hosting the sandbox 112 at the only network gateway 102, or all network gateways if a network has more than one, a network administrator can ensure that all traffic into the network can be subject to sandbox-based analysis. By hosting sandboxes at each client device 106, different sandboxes with different rules may be used by client devices of different types. For example, a server hosting customer payment data may have a more rigorous testing scheme than user workstation computers. In a case where the network administrator does not own or administer client device 106, the network administrator may only be able to configure a sandbox 112 at the network gateway 102 and the client device 106 owners may only be able to configure a sandbox 112 at their own client devices 106.

Figure 1C:
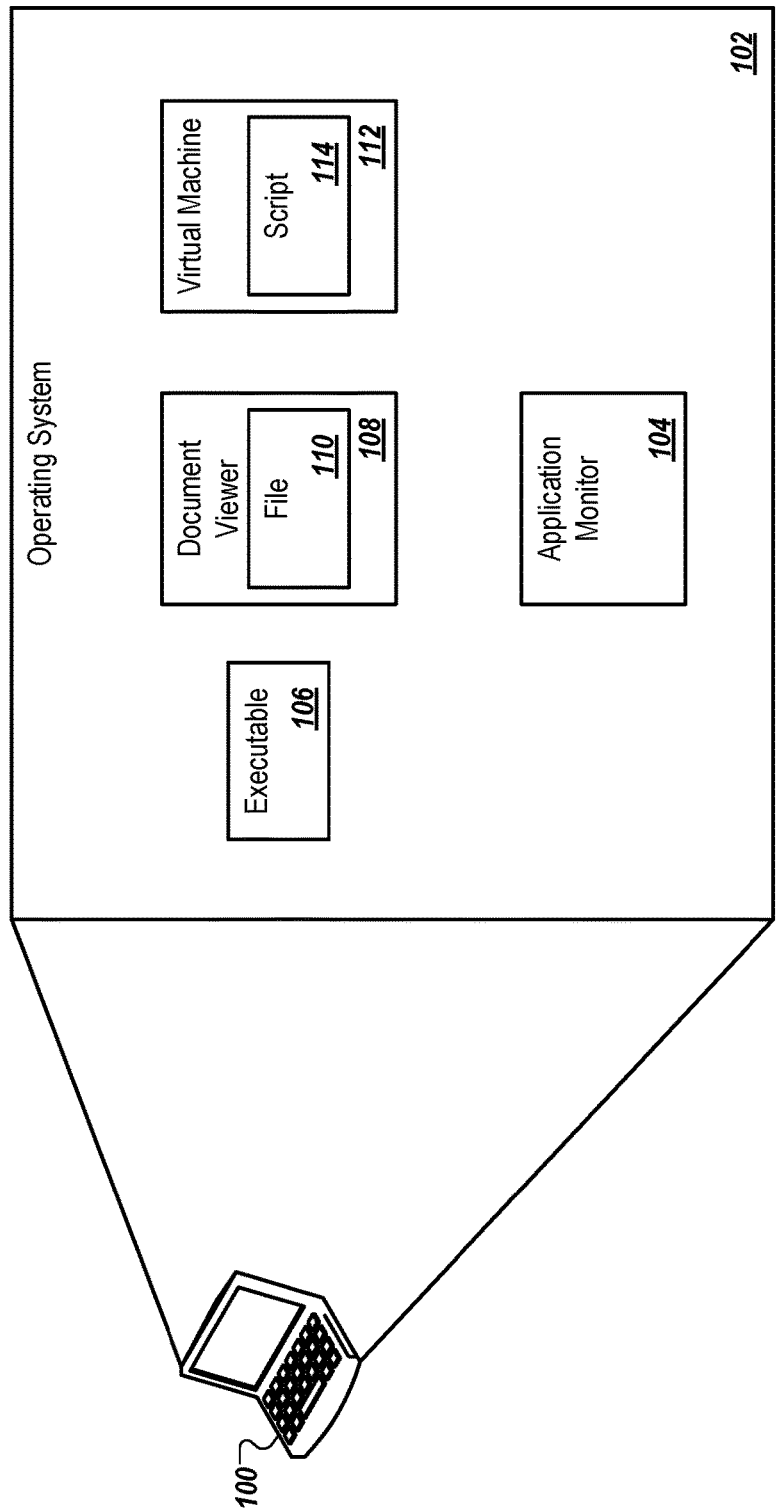

FIG. 1C shows an example of a computer 150 that monitors applications. The computer 150 includes an operating system 152 that hosts an application monitor 154, an executable 156, a document viewer 158 displaying a file 160 and a virtual machine 162 running a script 164. While not shown for clarity's sake, the computer 150 can include other elements including, but not limited to, input and output components, networking components, and other hardware and software.

The computer 150 can include any type of computer system that can execute a data object. Examples include, but are not limited to, desktop or laptop computers, server systems, mobile computing devices, or embedded computing devices (e.g., controllers in 'smart' appliances, automotive computing systems). The computer 150 includes and operating system 152, or other similar system, to host running application, provide those applications with an interface to the computer 150, to manage communications and storage, and for other purposes.

An application monitor 154 can run in the operating system, and/or may be a part of the operating system 154. The application monitor 154 may be configured to identify an execution of a data object by the computer 150. The execution of a data object can include, but is not limited to, the executable file 156 being executed, the file 160 being opened or used by the document viewer 158, and the script 164 running in the virtual machine 162.

In response to identifying the execution of the data object, the application monitor 154 can monitor the activities of the executing data object. For example, the application monitor 154 may monitor the system calls of the executable 156 to check for an indication of malicious behavior.

One type of malicious behavior includes an application performing sensitive actions before interacting with a user of the computer 150. For example, a normally functioning application will often draw a graphical user interface and present the interface to the user before accessing sensitive portions of the operating system 152. On the other hand, a malicious piece of adware may, instead of interacting with the user, install plug-ins to the user's web browser redirecting traffic to a network resource associated with the adware in order to monitor the user's web traffic.

If the application monitor 154 determines that the data object has requested a sensitive action before interacting with a user of the computer 150, the application monitor can classify, or cause another element to classify, the running data object as a high-risk data object. For example, the application monitor 154 may report to security software on the computer 150 (not shown) that the executable 156 has written data outside the executable 156's directory before interacting with the user. The security software may use this as one signal to determine if the executable 156 is to be classified as malicious. For example, if the executable 156 is on a whitelist of known-good application, the executable 156 may be allowed to run as normal. If, on the other hand, the executable 156 provides other signals of risk (e.g., newly loaded onto the computer system 150, containing encrypted containers that are decrypted at runtime, sporadically sending large amounts of data over the network) the security software may delete, isolate in a sandbox, or otherwise handle the executable 156 in a way that protects the computer 150.

Figure 2:
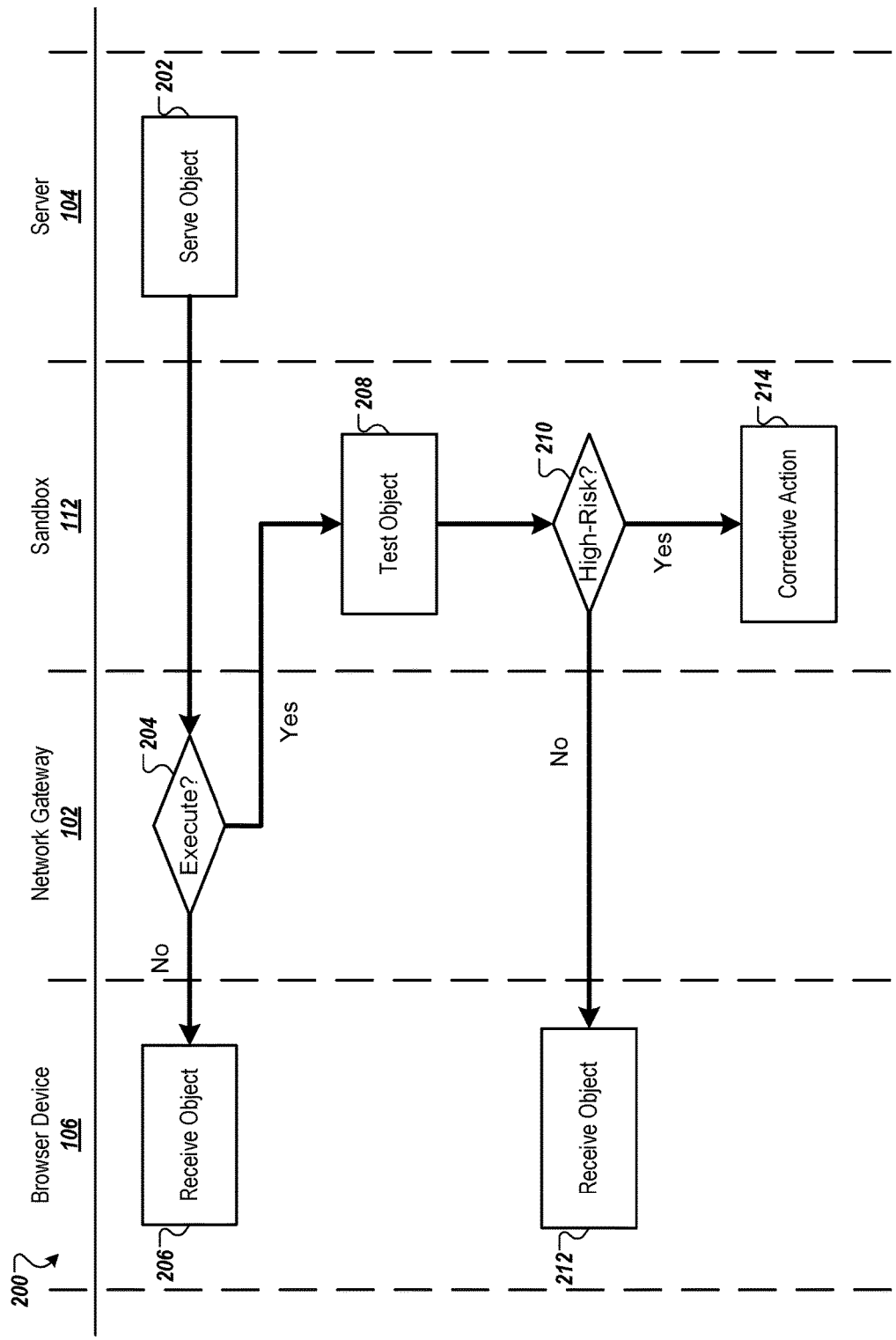
FIG. 2 is a swim-lane diagram of an example process for identifying malicious data objects.

FIG. 2 is a swim-lane diagram of an example process 200 for testing software for signs of risk. For clarity, the process 200 is being described with reference to the elements shown in FIG. 1A. However, other components, including but not limited to those shown in FIG. 1B, may be used to perform the process 200 or similar processes.

At 202, the server 104 serves a data object. For example, the browser device 106 may send a request (e.g., a File Transfer Protocol (FTP) or Internet Message Access Protocol (IMAP) request) to the server 104. In response, the server 104 can send a reply message that includes a data object. The data object may be of a type that includes instructions that, when run, can cause a computer to execute the instructions. In some cases, the data object may be an executable program, a file including executable instructions and file data, or a script including executable instructions The network gateway 102 intercepts the data object and determines 204 if the data object should be executed. For example, the network gateway 102 may intercept every executable file coming into the network 100. In another example, the server 104 may be compared a profile of suspicious servers for which additional security measures are taken.

If the network gateway 102 determines that the data object should not be executed (e.g., because the server 104 or data object is on a white-list), the browser device 106 receives the object. If the network gateway 102 determines that the object should be executed, the sandbox 112 tests the data object at 208. For example, the data object may be a binary file and the network gateway 102 may load the data object into the sandbox 112 that mimics the hardware and software needed for execution of the binary file. In another example, the data object may be a script or object file created from a script and the sandbox 112 may run an interpreter on the script or object file. In yet another example, the data object may be a file associated with a program (e.g. a word processor document) that includes scripting or macro instruction and the sandbox 112 may load the file in the associated application.

The 112 sandbox may then monitor the data object to determine if it attempts to execute a sensitive action before attempting to interact with a user. Examples of sensitive actions include, but are not limited to opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device. Mutexes generally include program objects that allow multiple program threads to share the same resource. Sensitive location on the computing device can include, but are not limited to, hardware registers, directories associated with different users or operating system files, and network communications. Examples of interactions with the user of the computing device include, but are not limited to, generating a dialog box, displaying a progress bar, displaying a window with an input element, or receiving input from the user. Receiving input from the user may or may not be configured to include arguments used when launching the data object from a terminal command.

At 210, the sandbox 112 determines if the data object is high-risk. For example, if the data object attempts to perform one or more sensitive actions before interacting with the user, the sandbox 112, or another system, may determine that the data object is high-risk. If, for example, the data object attempts to interact with a user before performing a sensitive action, the sandbox 112, or another system, may determine that the data object is not high-risk.

In some implementations, some types of user-interaction may be excluded. For example, a malicious data object may be designed to both perform sensitive actions and interact with the user in a way that is distracting (e.g., opening hundreds of dialog boxes). In another example, a malicious data object may be configured to interact with a user-interface device in a nearly imperceptible way in an attempt to bypass the test described here. Such user interaction may include changing one pixel of a visual display, playing a short, quiet sound from a speaker, or capturing a keystroke when another application has focus. These types of user interactions may be excluded from the determination.

If the sandbox 112 determines that the object is not high-risk, the browser device 106 receives the object at 212. If the sandbox 112 determines that the object is high risk, the sandbox 112 takes corrective action at 214. Example corrective actions can include, but are not limited to, terminating the execution of the data object, increasing a risk metric, setting a risk metric, quarantining the data object, logging additional requests by the data object, or deleting the data object. A risk metric may be a value created by the sandbox 112, or other system, used to determine if the data object is high risk. In one example scheme, a data object may start with a risk metric value of 0. The data object may be subject to the test described here, along with other tests (e.g., signature matching to known malware, determination of the geographic location the data object was served from, cryptographic signature from a known developer). Each of these tests may add an integer value to the risk metric. If the sum of all these values is greater than a threshold value, the risk metric may indicate that the data object is high-risk. Other scheme of using a risk metric are possible In some cases, the corrective action can include further testing to determine if the data object is malicious. This further testing may be automated and/or may include sending a notification to a network administrator. If the automated testing and/or administrator determine that the high-risk data object is not, in fact malicious, the high-risk data object may be served to the browser device 106.

Although a particular type, number, and order of operations is shown here, different types, numbers, and orders of operations are possible to perform the process 200 or other similar processes. For example, in some cases, the client device 106 may host the sandbox 112.

Figure 3A:
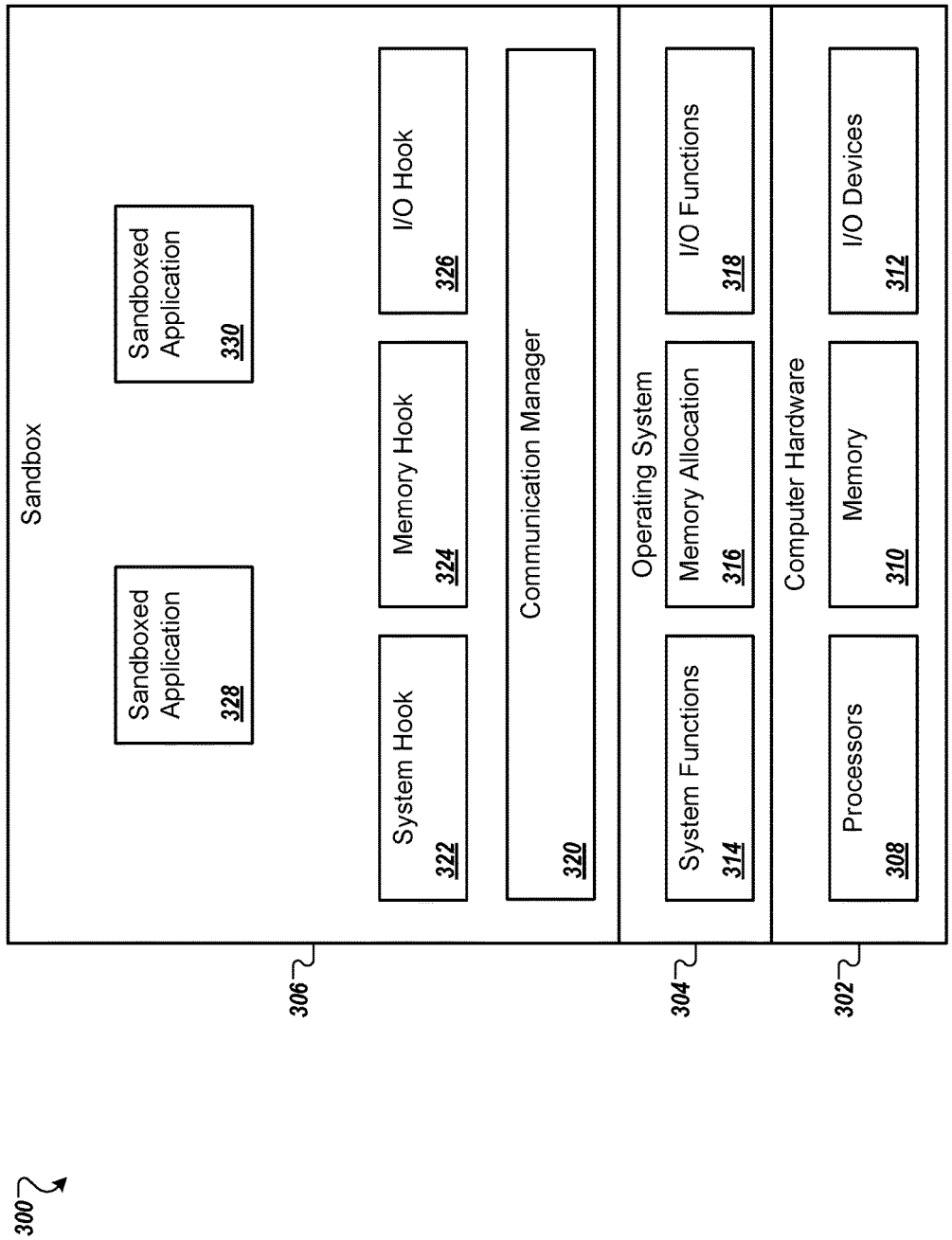
FIGS. 3A and 3B are block diagrams of example computing sandbox techniques.
Figure 3B:
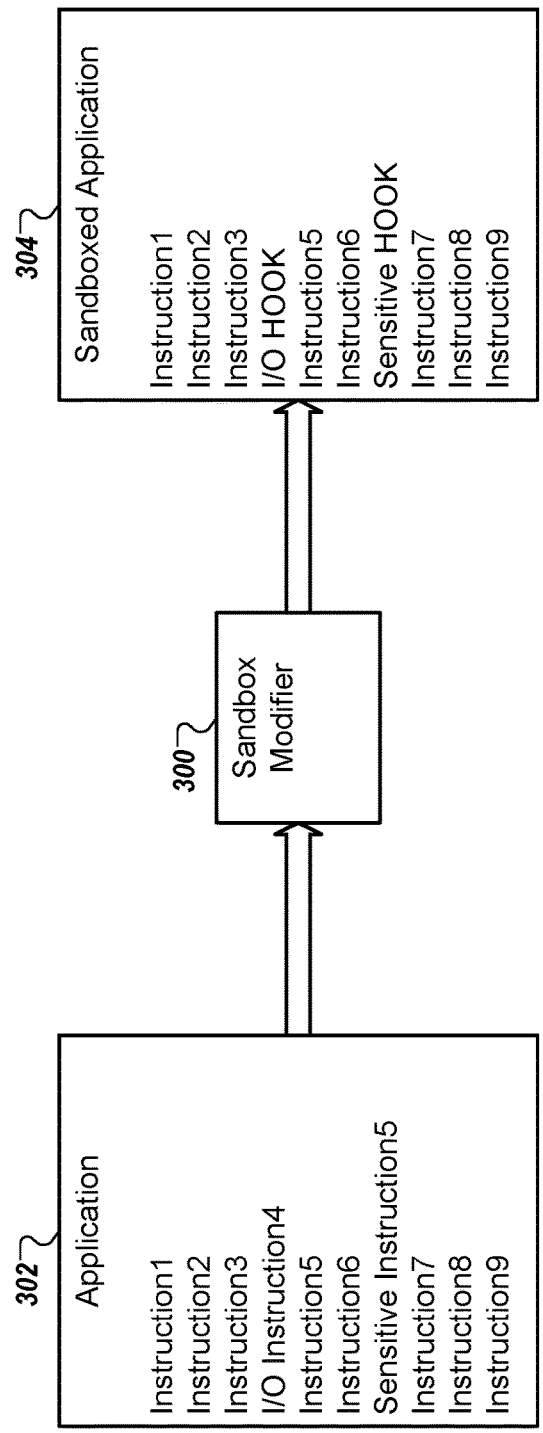

FIGS. 3A and 3B are block diagrams of example computing sandbox techniques.

In FIG. 3A, a computer system 300 hosts a sandbox for running applications. The computer system 300 includes hardware 302, an operating system 304 running on the hardware 302, and a sandbox 306 hosted by the operating system.

The hardware 302 includes the collection of physical elements of the computer system 300. The hardware 302 shown includes a processor 308, memory 310, and I/O devices 312, though other configurations are possible. The processor 308 is one or more computing processors capable of carrying out computing instructions. The memory 310 includes long term storage (e.g., hard disk) and system memory (e.g., Random Access Memory (RAM) components). The I/O devices 312 include hardware for input and output, such as for communicating with users and other computer systems. Example I/O devices include, but are not limited to, keyboards, pointer devices, speakers, and network connections.

The operating system 304 may run on the computer hardware 302. In general, the operating system is software that manages computer hardware and software resources and provides common services for computer programs. The operating system includes system functions 314. These system functions 314 can provide access to the computer hardware, or can provide a single interface for common functions. Example system functions 314 include, but are not limited to, functions for establishing a service or daemon, reading an environment variable, and turning the computer system 300 off. Memory allocation functions 316 allow a caller to allocate, de-allocate, read, write, lock, or otherwise interact with the memory 310. I/O Functions 318 can allow a caller to interact with I/O devices 312. Example I/O functions include, but are not limited to, functions for establishing network sockets, writing to display buffers, and reading input from pointer devices.

The operating system can host one or more application. These application include, but are not limited to, web browsers, document editors, web servers, video games, and other applications which may or may not have user-facing components. Additionally, the operating system 304 can host one or more other execution environments. One such execution environment is the sandbox 306.

The sandbox 306 includes an execution environment for hosting one or more applications, including sandboxed applications 328 and 330. Instead of accessing the system functions 314, memory allocation 316, and I/O functions 318, the sandboxed applications 328 and 330 may be permitted only to access system hooks 322, memory hooks 324, and I/O hooks 326. In some configurations, the system hooks 322, memory hooks 324, and I/O hooks 326 may have the same interfaces as the system functions 314, memory allocation 316, and I/O functions 318 and may imitate the interfaces of the operation system 304. In some configurations, the system hooks 322, memory hooks 324, and I/O hooks 326 may have a different interface or interfaces. When making a call to a system hooks 322, memory hooks 324, or I/O hooks 326, a communication manager 302 in the sandbox 306 may examine the call and determine how to respond to the call, if at all. In some cases, the call may be passed to a corresponding system function 314, memory allocation 316, or I/O function 318. In some cases, the communication manager 320 may generate a response without communicating with the operating system. Additionally, the communication manager 320 can perform additional functions related to these calls. Calls may be logged and/or analyzed to determine, for example, if the call attempts to perform a restricted action or a permitted action on a restricted resource. The communication manager 320 may treat calls from each application 328 and 330 differently or the same, depending on the configuration.

The sandbox 306 may be used for one or more of a variety of functions. In one use, the sandbox 306 is used to provide security to the computer system 300 while the sandboxed application 328 and 330 are run. For example, the sandboxed application 328 and 330 may be from an untrusted source or may be known to have malicious behavior. By monitoring communications between the sandboxed application 328 and 330 and the operating system 304, the communication manager 320 can prevent the sandboxed application 328 and 330 from having an undesirable effect on the operating system 304.

In another use, the sandbox may be part of a virtual machine. Virtual machines are logical recreations of a full or partial computing system hosted on a real computer system like the computer system 300. Virtual machines may be used in some cases to interpret scripting language application, allowing the scripting language to be platform agnostic. Additionally or alternatively, virtual machines may be used to provision a single computer system 300 to multiple uses. For example, if the computer system 300 is a networked server computer, multiple virtual servers may be provisioned on the single real server.

In yet another use, the sandbox may be part of an emulator. Emulators are a specific type of virtual machine where the system hooks 322, memory hooks 324 and I/O hooks 326 provide a different interface than what is provided by the operating system 304. For example, a virtual machine emulating a mobile computing device may be used on a desktop computing device running a different operating system. This emulated mobile computing device may be to test an application that is developed on the desktop device but targeted for use in the mobile device.

In FIG. 3B, a sandbox modifier 350 replaces instructions in an application 352 to create a sandboxed application 354. This replacement process may be used in addition to or in the alternative to the sandbox 356 previously described.

As part of loading the application 352 for execution, a computer system can use the sandbox modifier 350 to identify and replace some of the instructions of the application 352. For binary executable applications 352, the instructions replaced include binary computer instructions. For scripted applications 352, the instructions replaced include scripting instructions.

The sandbox modifier 350 can inspect the application 352 and identify any instructions that, for example, include calls to the operating system or include calls to sensitive computing resources. In the example shown, the sandbox modifier 350 identifies two instructions, "I/O instruction4" and "Sensitive Instruction5." Before loading the application 352, the sandbox modifier can modify the application 352 by replacing these two instructions with calls to, for example, a sandbox interface that includes hooks for function calls to the operating system. By performing such a replacement, the sandbox modifier 354 can ensure that the application 352 does not attempt to call an unauthorized function and/or "escape" the sandbox.

Figure 4:
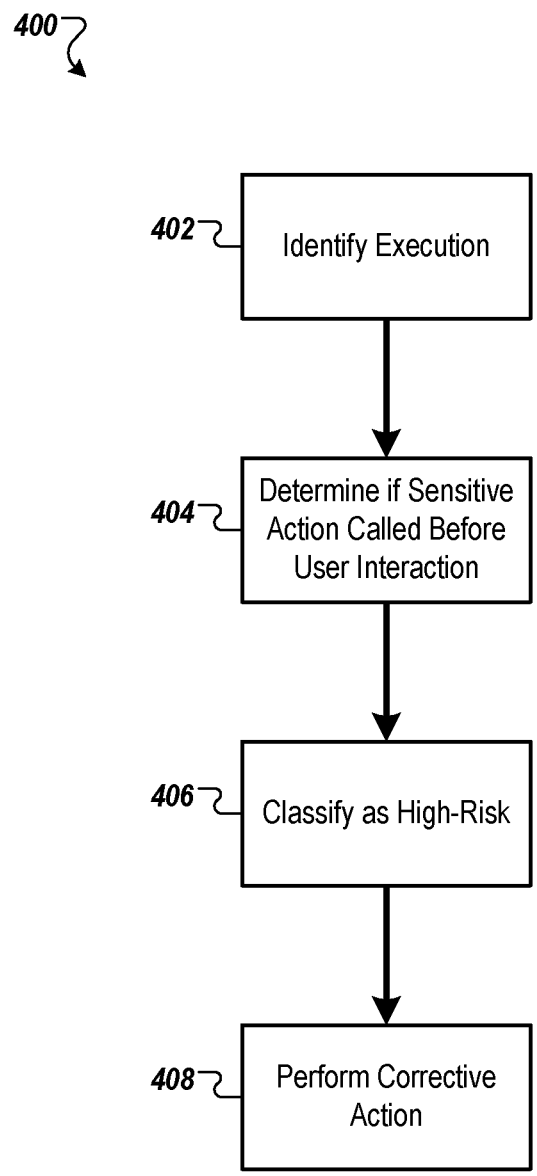
FIG. 4 is a flowchart of an example process for identifying malicious data objects.

FIG. 4 is a flowchart of an example process for testing software for signs of risk.

Execution of a data object by a computing device is identified (402). For example, a user may insert a removable memory device (e.g., compact disk, flash memory device) into a computer and instruct the computer to open the file on the memory device. The computer may identify the file as being associated with a word processing application, launch the work processing application if it is not already running, and open the file with the work processing application.

In response to identifying the execution of the data object, it is determined (404) that the data object has requested a sensitive action of the computing device before interacting with a user of the computing device. For example, the file may include a macro or script that instructs the work processing application to delete files in the computer's root directory upon opening. The computer may determine that this request is a sensitive action, and that no user interaction was instructed before this sensitive action.

In response to determining that the data object has requested the sensitive action, the data object is classified (406) as a high-risk data object. For example, because the computer identified the file as requesting a sensitive action before interacting with the user, the computer may flag the data file as high-risk.

In response to classifying the data object as a high-risk data object, at least one corrective action is performed (408) on the data object. Once identified as high-risk, the computer may perform a corrective action on the file. In one example, the computer's anti-virus program may flag the file for user review, prompting the user to quarantine the file. In another example, the computer may deny the file's delete request and close the work processor file.

Figure 5:
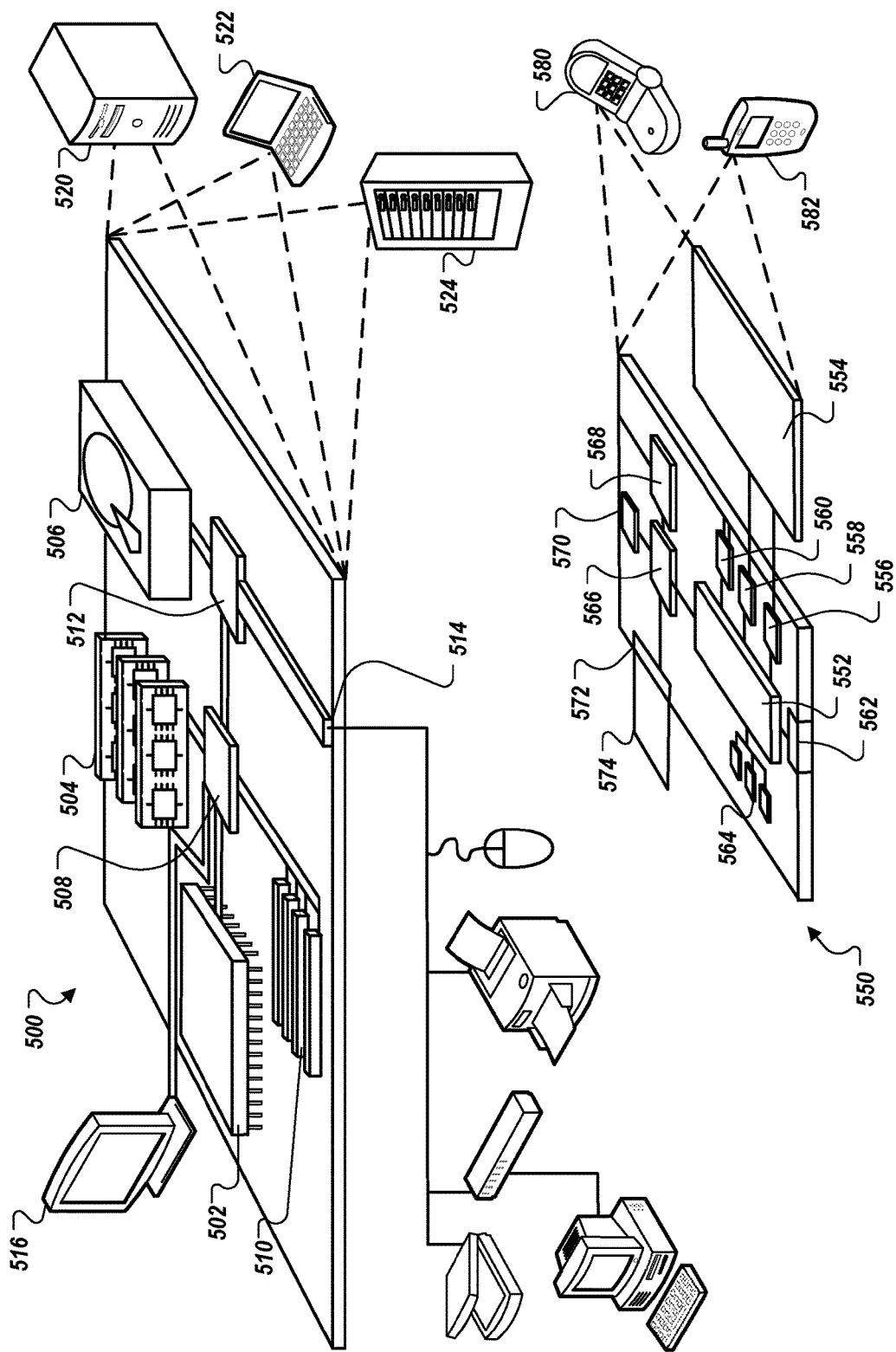
FIG. 5 is a schematic diagram that shows an example of a computing device and a mobile computing device.

Although a particular type, number, and order of operations is shown here, different types, numbers, and orders of operations are possible to perform the process 200 or other similar processes. For example, the instructions of the data object may be inspected before allowing it to run to determine if the instructions would request a sensitive action of the computing device before interacting with a user of the computing device FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

What is claimed is:

1. A method performed by data processing apparatus, the method comprising:
   receiving, by a network gateway, a message from outside of a network addressed to a device inside the network, the message containing a data object;
   replacing instructions in the data object that request sensitive actions with corresponding instructions that pass requests for sensitive actions to an execution manager, the execution manager configured to examine the requests for sensitive actions before they are provided to the computing device;
   executing the data object by the network gateway;
   in response to the execution of the data object, determining that the data object has requested a sensitive action before the data object has attempted an interaction with a user; and
   in response to determining that the data object has requested the sensitive action, classifying the data object as a high-risk data object.

2. The method of claim 1, wherein the sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device.

3. The method of claim 1, wherein the data object's attempted interaction with the user includes at least one of: generating a dialog box, displaying a progress bar, displaying a window with an input element, or receiving input from the user.

4. The method of claim 1, further comprising, in response to classifying the data object as a high-risk data object, performing a corrective action on the data object.

5. The method of claim 4, wherein the corrective action includes at least one of terminating the execution of the data object, increasing a risk metric associated with the data object, setting a risk metric associated with the data object, quarantining the data object, logging additional requests by the data object, or deleting the data object.

6. The method of claim 1, wherein the execution of the data object is in a sandboxed environment of the gateway and wherein requests for sensitive actions are examined by the sandboxed environment.

7. The method of claim 1, wherein the data object includes at least one of an executable program, a file including executable instructions and file data, or a script including executable instructions.

8. The method of claim 1, wherein the execution of the data object includes at least one of executing instructions in the data object, or interpreting instructions in the data object for execution.

9. A non-transitory computer usable storage media tangibly encoded with computer program instructions that, when executed by one or more processors, cause a computer device to perform operations comprising:
   receiving, by a network gateway, a message from outside of a network addressed to a device inside the network, the message containing a data object;
   replacing instructions in the data object that request sensitive actions with corresponding instructions that pass requests for sensitive actions to an execution manager, the execution manager configured to examine the requests for sensitive actions before they are provided to the computing device;
   executing the data object by the network gateway;
   in response to the execution of the data object, determining that the data object has requested a sensitive action before the data object has attempted an interaction with a user; and
   in response to determining that the data object has requested the sensitive action, classifying the data object as a high-risk data object.

10. The non-transitory computer usable storage media of claim 9, wherein the sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device.

11. The non-transitory computer usable storage media of claim 9, wherein the data object's attempted interaction with the user includes at least one of: generating a dialog box, displaying a progress bar, displaying a window with an input element, or receiving input from the user.

12. The non-transitory computer usable storage media of claim 9, the operations further comprising, in response to classifying the data object as a high-risk data object, performing a corrective action on the data object.

13. The non-transitory computer usable storage media of claim 12, wherein the corrective action includes at least one of terminating the execution of the data object, increasing a risk metric associated with the data object, setting a risk metric associated with the data object, quarantining the data object, logging additional requests by the data object, or deleting the data object.

14. The non-transitory computer usable storage media of claim 9, the operations further comprising executing the data object in a sandboxed environment of the gateway wherein requests for sensitive actions are examined by the sandboxed environment.

15. The non-transitory computer usable storage media of claim 9, wherein the data object includes at least one of an executable program, a file including executable instructions and file data, or a script including executable instructions.

16. The non-transitory computer usable storage media of claim 9, wherein the execution of the data object includes at least one of executing instructions in the data object, or interpreting instructions in the data object for execution.

17. A system comprising:
one or more hardware processors configured to execute computer program instructions; and
a non-transitory computer usable storage media tangibly encoded with computer program instructions that, when executed by one or more processors, cause a computer device to perform operations comprising:
receiving, by a network gateway, a message from outside of a network addressed to a device inside the network, the message containing a data object;
replacing instructions in the data object that request sensitive actions with corresponding instructions that pass requests for sensitive actions to an execution manager, the execution manager configured to examine the requests for sensitive actions before they are provided to the computing device;
executing the data object by the network gateway;
in response to the execution of the data object, determining that the data object has requested a sensitive action before the data object has attempted an interaction with a user; and
in response to determining that the data object has requested the sensitive action, classifying the data object as a high-risk data object.

18. The system of claim 17, wherein the sensitive action includes at least one of opening a mutex, creating a mutex, accessing a file outside of a local directory associated with the data object, accessing sensitive locations on the computing device, requesting network activity, launching a process, injecting a process, accessing a registry of the computing device, launching a dynamic linked library (DLL), or manipulating a service executing on the computing device.

19. The system of claim 17, wherein the data object's attempted interaction with the user includes at least one of: generating a dialog box, displaying a progress bar, displaying a window with an input element, or receiving input from the user.

20. The system of claim 17, the operations further comprising, in response to classifying the data object as a high-risk data object, performing a corrective action on the data object.

21. The system of claim 20, wherein the corrective action includes at least one of terminating the execution of the data object, increasing a risk metric associated with the data object, setting a risk metric associated with the data object, quarantining the data object, logging additional requests by the data object, or deleting the data object.

22. The system of claim 17, wherein the execution of the data object is in a sandboxed environment of the gateway and wherein requests for sensitive actions are examined by the sandboxed environment.

23. The system of claim 17, wherein the data object includes at least one of an executable program, a file including executable instructions and file data, or a script including executable instructions.

24. The system of claim 17, wherein the execution of the data object includes at least one of executing instructions in the data object, or interpreting instructions in the data object for execution.

* * * * *